(12) United States Patent
Itoh et al.

(10) Patent No.: US 11,536,982 B2
(45) Date of Patent: Dec. 27, 2022

(54) ANTI-VIBRATION OPTICAL DEVICE

(71) Applicant: KAMAKURA KOKI CO., LTD., Warabi (JP)

(72) Inventors: Haruo Itoh, Kanagawa (JP); Kazuya Miyaji, Kawaguchi (JP)

(73) Assignee: KAMAKURA KOKI CO., LTD., Warabi (JP)

( * ) Notice: Subject to any disclaimer, the term of this patent is extended or adjusted under 35 U.S.C. 154(b) by 0 days.

(21) Appl. No.: 17/119,416

(22) Filed: Dec. 11, 2020

(65) Prior Publication Data

US 2021/0255474 A1 Aug. 19, 2021

(30) Foreign Application Priority Data

Feb. 19, 2020 (JP) .............................. JP2020-025750

(51) Int. Cl.
G02B 27/64 (2006.01)
G02B 23/02 (2006.01)
G02B 23/18 (2006.01)
G02B 23/24 (2006.01)

(52) U.S. Cl.
CPC .......... G02B 27/646 (2013.01); G02B 23/02 (2013.01); G02B 23/18 (2013.01); G02B 23/2484 (2013.01)

(58) Field of Classification Search
None
See application file for complete search history.

(56) References Cited

U.S. PATENT DOCUMENTS

2014/0092476 A1   4/2014  Ando et al.
2015/0153584 A1*  6/2015  Yasuda ................ G02B 27/646
                                                     359/557
2020/0304715 A1*  9/2020  Fushida ................ H04N 5/232

FOREIGN PATENT DOCUMENTS

DE   102013200315 A1   7/2014
EP      3460568 A1    3/2019
JP    H03149973 A     6/1991
JP    2015079086 A    4/2015

OTHER PUBLICATIONS

Extended European Search Report for European Application No. 20213141.3 dated May 25, 2021.

* cited by examiner

*Primary Examiner* — Derek S. Chapel
(74) *Attorney, Agent, or Firm* — Young Basile Hanlon & MacFarlane, P.C.

(57) ABSTRACT

An anti-vibration optical device includes an objective lens group provided on one side of a housing, an eyepiece group provided on another side of the housing, an image blur corrector housed into the housing to be located between the objective lens group and the eyepiece group and including an erecting prism, a gimbal mechanism rotatably supporting the erecting prism and an actuator for rotating the erecting prism via the gimbal mechanism, a first angular velocity detection sensor configured to detect a first angular velocity, which is an angular velocity of the housing, a second angular velocity detection sensor configured to detect a second angular velocity, which is an angular velocity of the erecting prism, and a controller configured to control the actuator on the basis of the first angular velocity and the second angular velocity.

6 Claims, 9 Drawing Sheets

ANTI-VIBRATION OPTICAL DEVICE

CROSS-REFERENCE TO RELATED APPLICATION(S)

This application claims priority to and the benefit of Japanese Application No. 2020-025750, filed on Feb. 19, 2020, the entire disclosure of which is hereby incorporated by reference.

TECHNICAL FIELD

The present disclosure relates to an anti-vibration optical device.

BACKGROUND

JP2015-79086A discloses an anti-vibration optical device with an image blur corrector housed into a housing to be located between an objective lens group and an eyepiece group and including an erecting prism, a supporting mechanism rotatably supporting the erecting prism and an actuator for rotating the erecting prism via the supporting mechanism, an angular velocity detection sensor for detecting an angular velocity of the erecting prism, and a controller for controlling the actuator on the basis of the angular velocity of the erecting prism detected by the angular velocity detection sensor.

In JP2015-79086A, the controller controls the actuator such that the erecting prism is oriented in the same direction as in an initial state.

The present disclosure was developed in view of the above situation and aims to provide an anti-vibration optical device capable of improving a flexibility in the arrangement of an erecting prism and accurately correcting an image blur.

SUMMARY

According to an aspect of the present disclosure, an anti-vibration optical device is provided which includes a housing, a first optical element provided on one side of the housing, a second optical element provided on another side of the housing, an image blur corrector housed into the housing to be located between the first optical element and the second optical element, the image blur corrector including an erecting prism, a supporting mechanism rotatably supporting the erecting prism and an actuator for rotating the erecting prism via the supporting mechanism, a first detector configured to detect a first angular velocity, the first angular velocity being an angular velocity of the housing, a second detector configured to detect a second angular velocity, the second angular velocity being an angular velocity of the erecting prism, and a controller configured to control the actuator on the basis of the first angular velocity detected by the first detector and the second angular velocity detected by the second detector.

According to the aspect of the present disclosure, it is possible to improve a flexibility in the arrangement of the erecting prism and accurately correct an image blur.

BRIEF DESCRIPTION OF DRAWINGS

DETAILED DESCRIPTION (First Embodiment) The configuration of an anti-vibration optical device according to a first embodiment of the present disclosure is described with reference to FIGS. 1 to 3 below. Throughout this specification, the same elements are denoted by the same reference signs.

Figure 1:
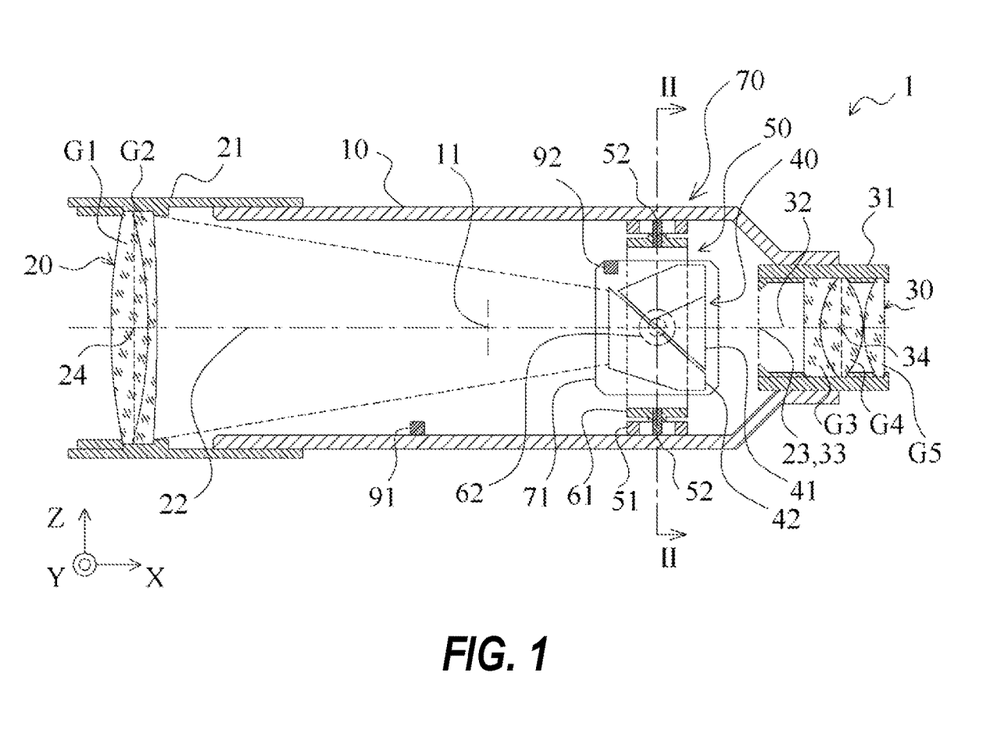
FIG. 1 is a sectional view showing an anti-vibration optical device according to a first embodiment of the present disclosure.

FIG. 1 is a sectional view showing an anti-vibration optical device 1 according to the first embodiment of the present disclosure. FIG. 2 is a sectional view along line II-II in FIG. 1. FIG. 3 is a configuration diagram showing the configuration of the anti-vibration optical device 1. It should be noted that a longitudinal direction, a width direction and a height direction of the anti-vibration optical device 1 are respectively a direction along an X axis, a direction along a Y axis and a direction along a Z axis in figures for the convenience of description.

Figure 2:
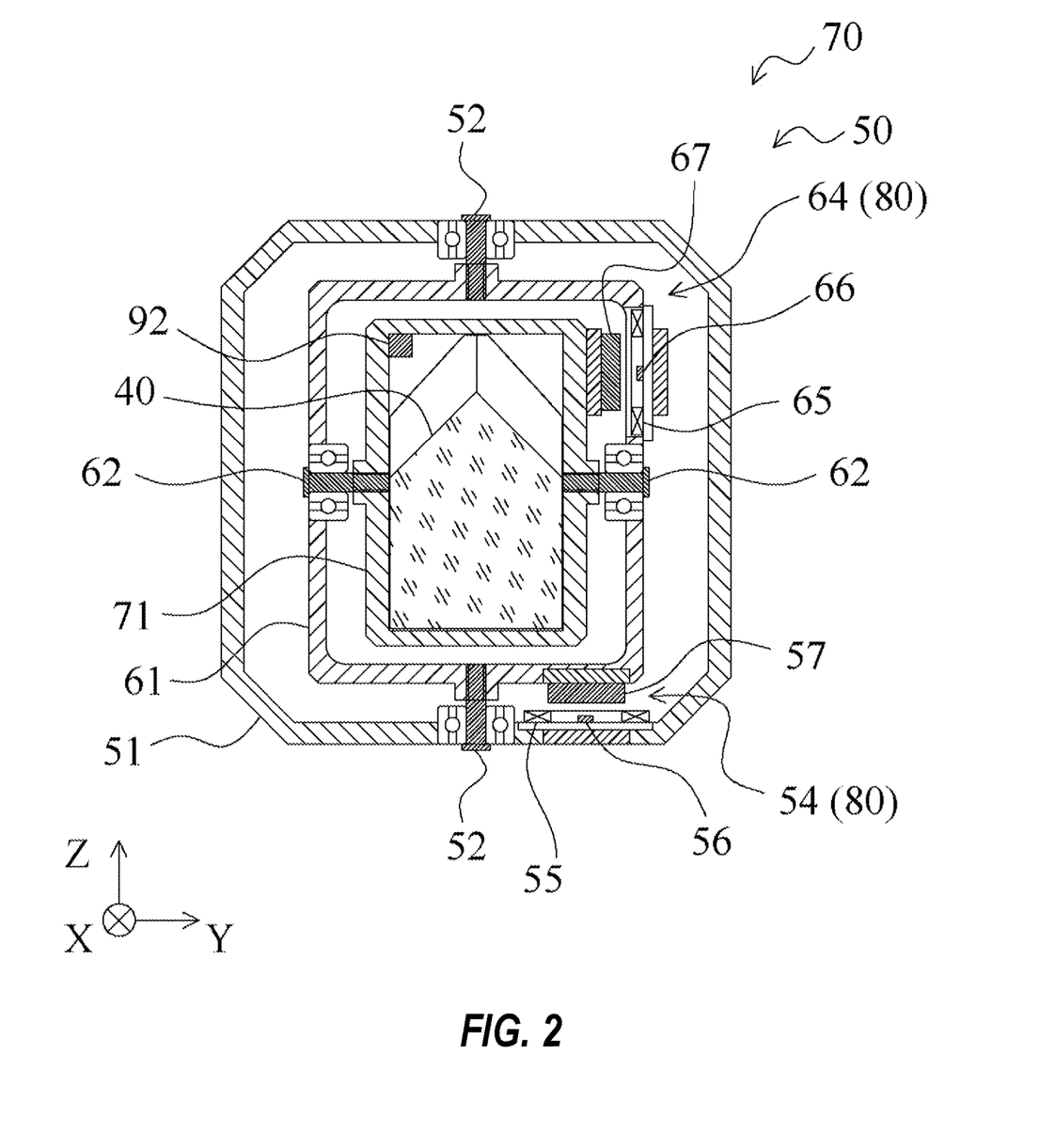
FIG. 2 is a sectional view along line II-II in FIG. 1.
Figure 3:
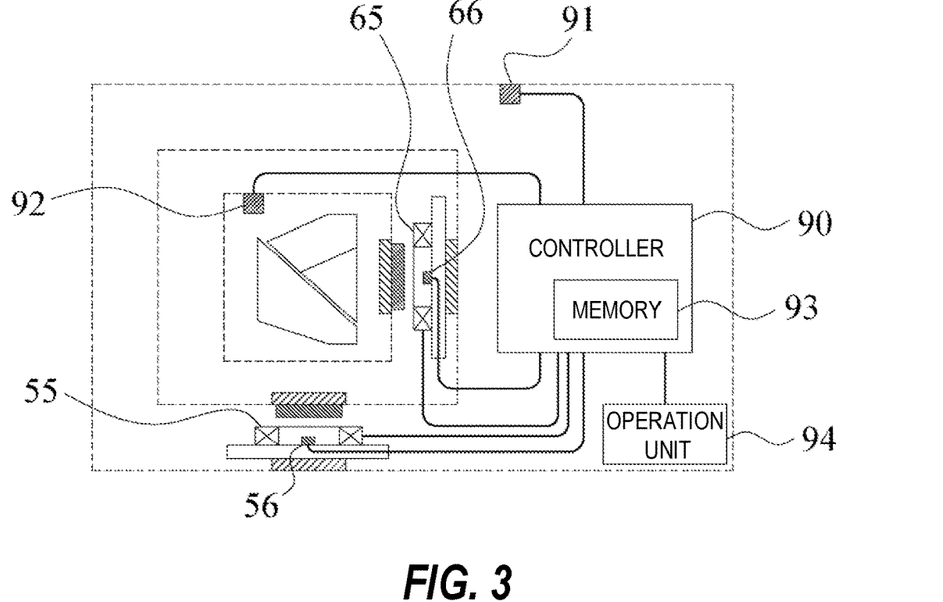
FIG. 3 is a configuration diagram showing a main configuration of the anti-vibration optical device.

As shown in FIGS. 1 to 3, the anti-vibration optical device 1 is, for example, constituted as a monocular for observing a target. The anti-vibration optical device 1 includes a housing 10, an objective lens group 20 serving as a first optical element, an eyepiece group 30 serving as a second optical element, an image blur corrector 70, a first angular velocity detection sensor 91 serving as a first detector, a second angular velocity detection sensor 92 serving as a second detector, an operation unit 94 and a controller 90. It should be noted that although the anti-vibration optical device 1 is constituted as a monocular (specifically, a monocular telescope) in the present embodiment, there is no limitation to this and the anti-vibration optical device 1 may be constituted as an imaging device further including an imaging element.

The housing 10 is a tubular (specifically, cylindrical) member extending along the longitudinal direction. The objective lens group 20, the eyepiece group 30, the image blur corrector 70, the first angular velocity detection sensor 91, the second angular velocity detection sensor 92 and the controller 90 are provided in the housing 10.

The objective lens group 20 is provided (fixed) on a front side (left side of FIG. 1) serving as one side of the housing 10 via an annular (specifically, circular annular) objective lens frame 21. The objective lens group 20 has a positive refractive power as a whole and is composed of a positive lens G1 and a negative lens G2 successively arranged from an objective side (left side of FIG. 1) toward an eyepiece side (right side of FIG. 1). An optical axis 22 of the objective lens group 20 extends along the longitudinal direction through a center of the objective lens group 20. A rear focus 23 of the objective lens group 20 is formed on an eyepiece side of the objective lens group 20.

The eyepiece group 30 is provided (fixed) on a rear side (right side of FIG. 1) serving as another side of the housing 10 via an annular (specifically, circular annular) eyepiece frame 31. The eyepiece group 30 has a positive refractive power as a whole and is composed of a negative lens G3, a positive lens G4 and a positive lens G5 successively arranged from the objective side (left side of FIG. 1) toward the eyepiece side (right side of FIG. 1). An optical axis 32 of the eyepiece group 30 extends along the longitudinal direction through a center of the objective lens group 30 to overlap the optical axis 22 of the objective lens group 20. A front focus 33 of the eyepiece group 30 is formed on an objective side of the eyepiece group 30.

The objective lens group 20 and the eyepiece group 30 are so arranged that the rear focus 23 and the front focus 33 coincide. In this way, if a user observes a target from the eyepiece group 30 with the objective lens group 20 facing toward the target, a real image of the target formed at the position of the rear focus 23 of the objective lens group 20 (i.e. the front focus 33 of the eyepiece group 30) can be enlarged and observed.

As shown in FIGS. 1 and 2, the image blur corrector 70 is an anti-vibration unit for correcting an image blur in the housing 10 due to hand shake or the like. The image blur corrector 70 is housed into the housing 10 to be located between the objective lens group 20 and the eyepiece group 30. Further, the image blur corrector 70 includes an erecting prism 40, a gimbal mechanism 50 serving as a supporting mechanism and an actuator 80.

The erecting prism 40 is a prism for converting an inverted image into an erect image. The erecting prism 40 is, for example, of the Schmidt-Pechan type and configured to include a roof prism 41 and an auxiliary prism 42. It should be noted that the erecting prism 40 is not limited to the Schmidt-Pechan type and may be, for example, a Porro type prism, an Abbe-Koenig type prism, a Schmidt prism or an Amici prism. Further, a reflection surface constituting the erecting prism 40 may be partially or entirely constituted by a plane mirror.

The gimbal mechanism 50 is a supporting mechanism rotatably supporting the erecting prism 40. The gimbal mechanism 50 includes an outer frame 51 fixed inside the housing 10, an inner frame 61 rotatably supported inside the outer frame 51 via a first pivot 52 extending along the height direction and a prism frame 71 rotatably supported inside the inner frame 61 via a second pivot 62 extending along the width direction. The erecting prism 40 is fixed in the prism frame 71.

The erecting prism 40 is so arranged that a center of gravity thereof is located on an extension of the first pivot 52 and an extension of the second pivot 62. Specifically, the erecting prism 40 is so arranged that a center of gravity synthesized by the prism frame 71 and the erecting prism 40 fixed to the prism frame 71 is located on the extension of the second pivot 62 and a center of gravity synthesized by the inner frame 61, the prism frame 71 and the erecting prism 40 supported by the inner frame 61 is located on the extension of the first pivot 52. In this way, the erecting prism 40 can be rotated with a minimum drive force by the actuator 80 (first actuator 54, second actuator 64).

In the present embodiment, the erecting prism 40 (specifically, the first and second pivots 52, 62, i.e. the center of gravity of the erecting prism 40) is provided to be located closer to the eyepiece group 30 than the objective lens group 20. In this way, an aperture of the objective lens group 20 can be increased without enlarging the erecting prism 40 as compared to a configuration in which the erecting prism 40 is provided at the middle position 11 between the objective lens group 20 and the eyepiece group 30 (i.e. at a position equidistant to the objective lens group 20 and the eyepiece group 30, specifically the middle position 11 between a rear principal point 24 of the objective lens group 20 and a front principal point 34 of the eyepiece group 30). Further, the weight reduction and miniaturization of the anti-vibration optical device 1 can be realized by the miniaturization of the erecting prism 40.

Further, the erecting prism 40 (specifically, the first and second pivots 52, 62, i.e. the center of gravity of the erecting prism 40) is preferably provided to be located between the middle position 11 between the rear principal point 24 of the objective lens group 20 and the front principal point 34 of the eyepiece group 30 and the rear focus 23 of the objective lens group 20 (front focus 33 of the eyepiece group 30).

Further, the erecting prism 40 is so set that a resonant frequency thereof has a value between 1 Hz and 20 Hz. Specifically, the erecting prism 40 is so set that the resonant frequency when the prism frame 71 and the erecting prism 40 rotate about the second pivot 62 has a value between 1 Hz and 20 Hz and the resonant frequency when the inner frame 61, the prism frame 71 and the erecting prism 40 rotate about the first pivot 52 has a value between 1 Hz and 20 Hz. The resonant frequency is set to have a suitable value since it is largely affected by moments of inertia about the pivots and a spring constant.

It is known that a hand shake frequency is generally in a range of 1 Hz to 20 Hz when the user uses the anti-vibration optical device 1 while holding the anti-vibration optical device 1 by hand. To cancel out the hand shake of the user and correct an image blur, the erecting prism 40 needs to be rotated in accordance with the hand shake frequency as a result. When the resonant frequency of the erecting prism 40 has properties almost close to those of the hand shake frequency of the user, the actuator 80 (first actuator 54, second actuator 64) can efficiently correct the image blur with a minimum drive force.

The actuator 80 is a driver for rotating the erecting prism 40 in two directions via the gimbal mechanism 50. The actuator 80 includes the first actuator 54 for rotating the inner frame 61 about the first pivot 52 and the second actuator 64 for rotating the prism frame 71 about the second pivot 62.

The first actuator 54 is a driver mounted between the inside of the outer frame 51 and the outside of the inner frame 61. The first actuator 54 is configured to include a first coil 55 mounted inside the outer frame 51, a first position detection sensor 56 mounted inside the outer frame 51 to be housed inside the first coil 55, and a first magnet 57 mounted outside the inner frame 61 to face the first coil 55. By causing a current to flow in the first coil 55, the inner frame 61 having the first magnet 57 mounted thereon can be rotated about the first pivot 52 with respect to the outer frame 51. Relative position information of the first coil 55 and the first magnet 57 can be detected by the first position detection sensor 56.

The second actuator 64 is a driver mounted between the inside of the inner frame 61 and the outside of the prism frame 71. The second actuator 64 is configured to include a second coil 65 mounted inside the inner frame 61, a second position detection sensor 66 mounted inside the inner frame 61 to be housed inside the second coil 65, and a second magnet 67 mounted outside the prism frame 71 to face the second coil 65. By causing a current to flow in the second coil 65, the prism frame 71 having the second magnet 67 mounted thereon can be rotated about the second pivot 62 with respect to the inner frame 61. Relative position information of the second coil 65 and the second magnet 67 can be detected by the second position detection sensor 66.

Although the gimbal mechanism 50 is composed of the outer frame 51, the inner frame 61 and the prism frame 71 in the present embodiment, there is no limitation to this and, for example, the gimbal mechanism 50 may be composed only of the outer frame 51 fixed inside the housing 10 and the prism frame 71 rotatably supported inside the outer frame 51 via a pivot. In this case, the actuator 80 does not include the first and second actuators 54, 64 and is composed of a driver mounted between the inside of the outer frame 51 and the outside of the prism frame 71.

The first angular velocity detection sensor 91 is a two-axis angular velocity detection sensor for detecting a first angular velocity A, which is an angular velocity of the housing 10, specifically an angular velocity corresponding to the inclination of the housing 10 due to hand shake or the like. Although the first angular velocity detection sensor 91 is mounted inside the housing 10 in the present embodiment, there is no limitation to this and, for example, the first angular velocity detection sensor 91 may be mounted on the outer frame 51.

The second angular velocity detection sensor 92 is a two-axis angular velocity detection sensor for detecting a second angular velocity B, which is an angular velocity of the erecting prism 40, specifically an angular velocity corresponding to the inclination of the erecting prism 40. The second angular velocity detection sensor 92 is mounted on the prism frame 71. It should be noted that, in the present embodiment, the first and second angular velocity detection sensors 91, 92 are both composed of a gyro sensor using a MEMS technology.

As shown in FIG. 3, the operation unit 94 is composed of an operation switch for instructing the start or end of an image blur correction process. The operation unit 94 outputs an operation signal corresponding to such an operation to the controller 90.

In the present embodiment, as shown in FIG. 3, the controller 90 controls the actuator 80 on the basis of the first angular velocity A output from the first angular velocity detection sensor 91 and the second angular velocity B output from the second angular velocity detection sensor 92. However, there is no limitation to this and the controller 90 may control the actuator 80 on the basis of the first angular velocity A output from the first angular velocity detection sensor 91, the second angular velocity B output from the second angular velocity detection sensor 92, relative positions of the first coil 55 and the first magnet 57 output from the first position detection sensor 56 and relative positions of the second coil 65 and the second magnet 67 output from the second position detection sensor 66.

The controller 90 is composed of a CPU serving as a computer. It should be noted that the controller 90 can also be composed of a plurality of microcomputers.

Further, a memory 93 is built in the controller 90. The memory 93 is a computer-readable recording medium for recording a proportionality coefficient k to be described later. The memory 93 records a processing program (e.g. image blur correction process) or an algorithm program to be executed in the controller 90. It should be noted that although the memory 93 is built in the controller 90 in the present embodiment, there is no limitation to this and, for example, the memory 93 may be provided separately from the controller 90.

Next, a binoculars 300 provided with the anti-vibration optical devices 1 is described with reference to FIG. 4.

Figure 4:
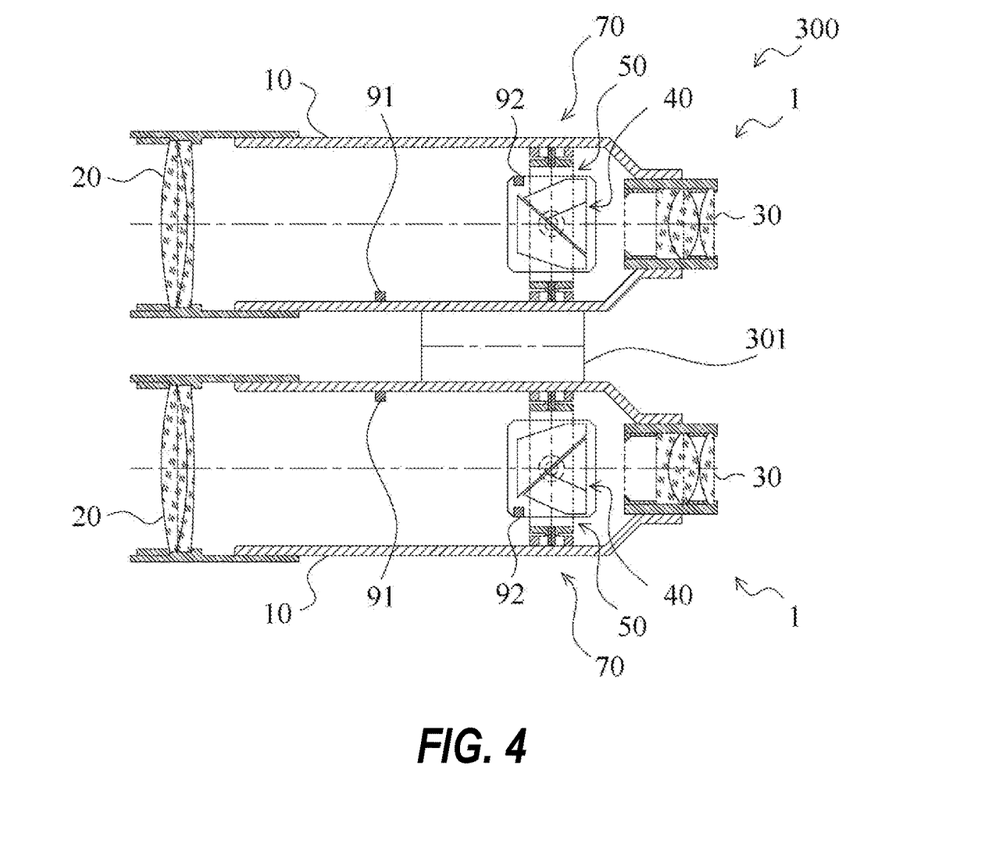
FIG. 4 is a sectional view showing a binoculars provided with the anti-vibration optical devices.

FIG. 4 is a sectional view showing the binoculars 300 provided with the anti-vibration optical devices 1.

As shown in FIG. 4, the binoculars (specifically, binocular telescope) 300 includes a pair of the anti-vibration optical devices 1, 1 serving as a pair of monoculars (specifically, monocular telescopes), and a coupling member 301 coupling the pair of anti-vibration optical devices 1, 1. A pair of the image blur correctors 70, 70 are respectively independently provided in the pair of anti-vibration optical devices 1, 1.

In the present embodiment, the pair of anti-vibration optical devices 1, 1 include a pair of the first angular velocity detection sensors 91, 91 and a pair of the controllers 90, and the pair of controllers 90 respectively control a pair of the actuators 80, 80 on the basis of the first angular velocities A output from the pair of first angular velocity detection sensors 91, 91. However, the pair of anti-vibration optical devices 1 are not limited to this and, for example, a single first angular velocity detection sensor 91 may be mounted only on one of the pair of anti-vibration optical devices 1 and each controller 90 may control each actuator 80 on the basis of the first angular velocity A output from the single first angular velocity detection sensor 91. Further, the pair of anti-vibration optical devices 1, 1 may include a single controller 90. In this case, the single controller 90 controls the pair of actuators 80, 80 in parallel on the basis of the first angular velocities A output from the pair of first angular velocity detection sensors 91, 91.

Next, the image blur correction process according to the first embodiment of the present disclosure is described with reference to FIG. 5.

Figure 5:
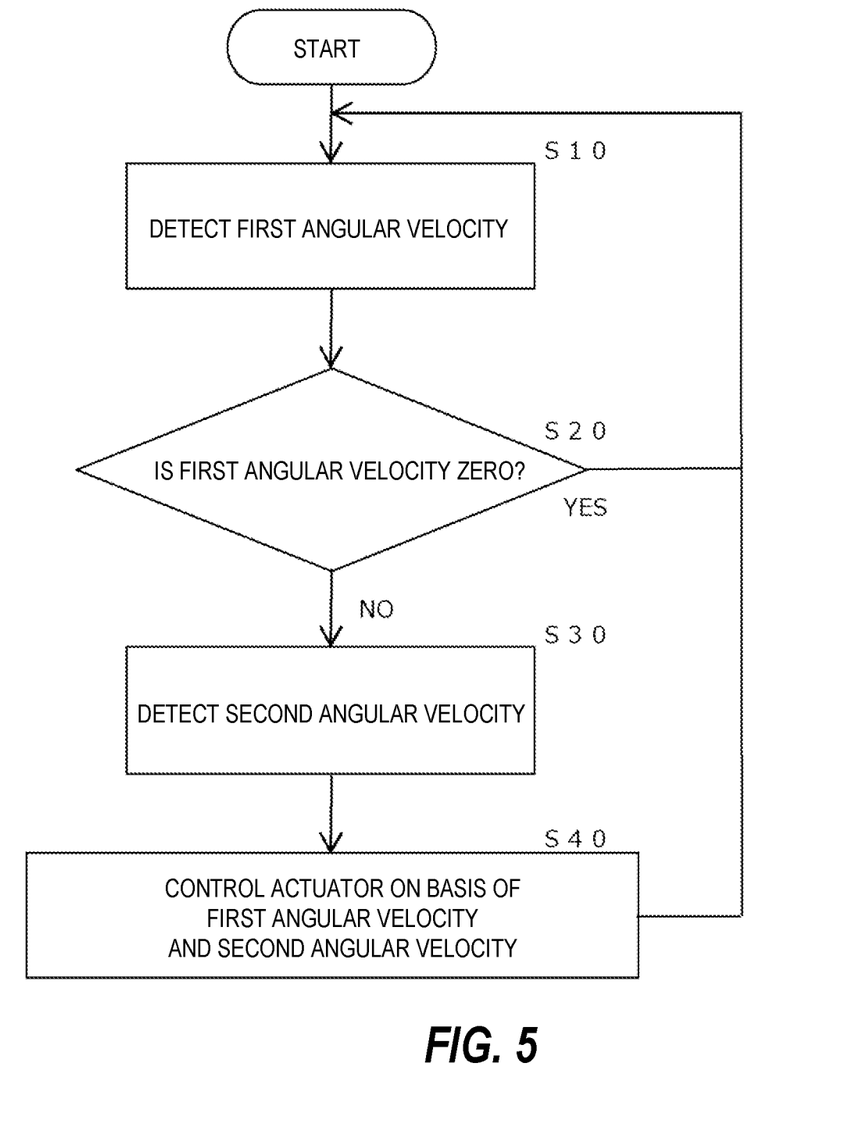
FIG. 5 is a flow chart showing an image blur correction process according to the first embodiment of the present disclosure.

FIG. 5 is a flow chart showing the image blur correction process according to the first embodiment of the present disclosure.

First, if the image blur correction process is started by a start operation on the operation unit 94 by the user, advance is made to Step S10.

As shown in FIG. 5, in Step S10, the first angular velocity detection sensor 91 detects the first angular velocity A, which is an angular velocity of the housing 10 of the anti-vibration optical device 1. Then, the first angular velocity detection sensor 91 outputs the detected first angular velocity A to the controller 90, and advance is made to Step S20.

Subsequently, in Step S20, the controller 90 determines whether or not the first angular velocity A output from the first angular velocity detection sensor 91 is zero. Return is made to Step S10 if the first angular velocity A is zero (in the case of Yes), i.e. if the housing 10 of the anti-vibration optical device 1 is not inclined due to hand shake or the like, whereas advance is made to Step S30 if the first angular velocity A is not zero (in the case of No).

Subsequently, in the case of No in Step S20, the second angular velocity detection sensor 92 detects the second angular velocity B, which is an angular velocity of the erecting prism 40 rotatably supported by the gimbal mechanism 50, in Step S30. Then, the second angular velocity detection sensor 92 outputs the detected second angular velocity B to the controller 90, and advance is made to Step S40.

Subsequently, in Step S40, the controller 90 controls the actuator 80 on the basis of the first angular velocity A output from the first angular velocity detection sensor 91 and the second angular velocity B output from the second angular velocity detection sensor 92, and return is made to Step S10.

Specifically, in Step S40, the controller 90 controls the actuator 80 such that the second angular velocity B is a product of the first angular velocity A and the proportionality coefficient k on the basis of the first angular velocity A output from the first angular velocity detection sensor 91, the second angular velocity B output from the second angular velocity detection sensor 92 and the proportionality coefficient k recorded in the memory 93 in advance.

Next, why the actuator 80 is controlled such that the second angular velocity B is a product of the first angular velocity A and the proportionality coefficient k is described with reference to FIG. 6.

Figure 6:
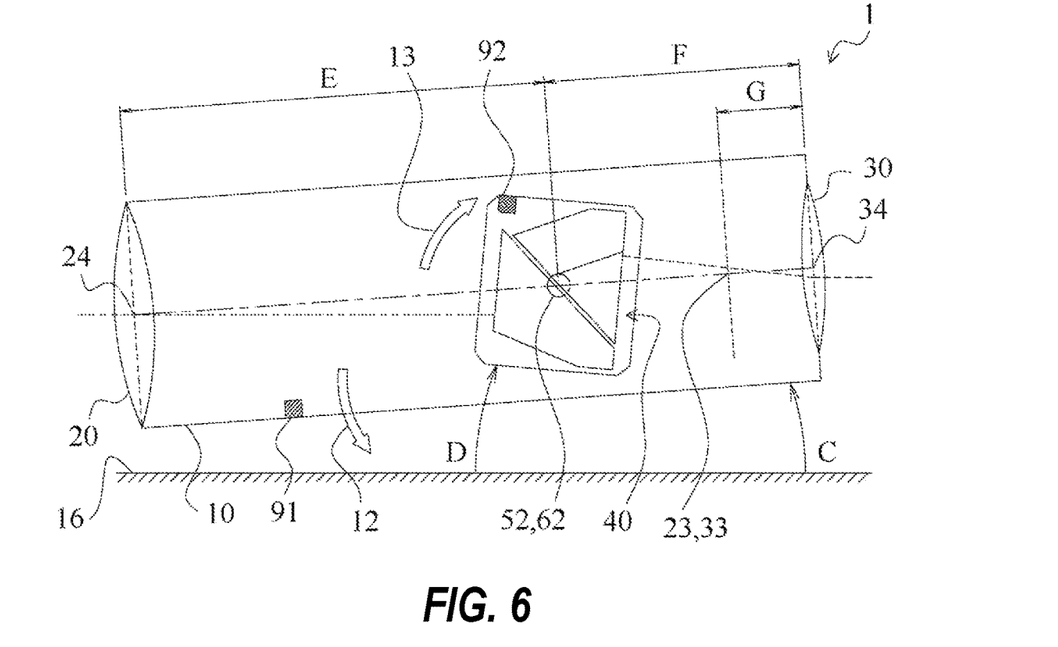
FIG. 6 is a schematic diagram showing why an actuator is controlled such that a second angular velocity is a product of a first angular velocity and a proportionality coefficient.

FIG. 6 is a schematic diagram showing why the actuator 80 is controlled such that the second angular velocity B is a product of the first angular velocity A and the proportionality coefficient k. It should be noted that a single objective lens and a single eyepiece are respectively shown as the objective lens group 20 and the eyepiece group 30 in FIG. 6.

In FIG. 6, a plane extending along the longitudinal direction is referred to as a reference plane 16. The reference plane 16 is parallel to an extending direction of the housing 10 when the housing 10 of the anti-vibration optical device 1 is not inclined due to hand shake or the like. As shown in FIG. 6, if the housing 10 is inclined by a swing angle C in a direction indicated by an arrow 12 (i.e. counterclockwise direction) due to hand shake or the like, the controller 90 needs to control the actuator 80 such that the erecting prism 40 is rotated by a rotation angle D in a direction indicated by an arrow 13 (i.e. clockwise direction) to correct such hand shake, i.e. to cause a ray incident on the objective lens group 20 along a direction parallel to the reference plane 16 (longitudinal direction) to be emitted along the longitudinal direction from the eyepiece group 30. It should be noted that the swing angle C is a swing angle of the housing 10 with respect to the reference plane 16, and the rotation angle D is a rotation angle of the erecting prism 40 with respect to the reference plane 16.

Here, the rotation angle D of the erecting prism 40 is a product of the swing angle C of the housing 10 and the proportionality coefficient k. The first angular velocity A, which is an angular velocity of the housing 10, detected by the first angular velocity detection sensor 91 is a value obtained by differentiating the swing angle C of the housing 10 by time. On the other hand, the second angular velocity B, which is an angular velocity of the erecting prism 40, detected by the second angular velocity detection sensor 92 is a value obtained by differentiating the rotation angle D of the erecting prism 40 by time. Specifically, either of a value obtained by dividing the rotation angle D by the swing angle C and a value obtained by dividing the second angular velocity B by the first angular velocity A is the proportionality coefficient k.

Since the position of the erecting prism 40 is located closer to the eyepiece group 30 than the objective lens group 20 in the present embodiment, the proportionality coefficient k is set to be negative in advance. In this case, the controller 90 controls the actuator 80 such that the erecting prism 40 is rotated in a direction opposite to a swing direction of the housing 10 with respect to the reference plane 16.

The proportionality coefficient k is based on relative position-related information of the erecting prism 40 with respect to the objective lens group 20 and the eyepiece group 30. Specifically, the proportionality coefficient k is known to satisfy the following Equation (1) from a result of ray tracking. It is assumed that a first distance E is a distance between the objective lens group 20 (specifically, the rear principal point 24 of the objective lens group 20) and the erecting prism 40 (specifically, the first and second pivots 52, 62, i.e. the center of gravity of the erecting prism 40), a second distance F is a distance between the eyepiece group 30 (specifically, the front principal point 34 of the eyepiece group 30) and the erecting prism 40 (specifically, the first and second pivots 52, 62, i.e. the center of gravity of the erecting prism 40) and a third distance G is a distance between the eyepiece group 30 (specifically, the front principal point 34 of the eyepiece group 30) and the front focus 33 of the eyepiece group 30 (rear focus 23 of the objective lens group 20).

$$k = 0.5(F-E)/(F-G) \quad \text{(Equation 1)}$$

If the first, second and third distances E, F and G are respectively 60 mm, 25 mm and 15 mm as an example of the present embodiment, the proportionality coefficient k is −1.75. Thus, if the swing angle C of the housing 10 is +1°, the controller 90 controls the actuator 80 such that the rotation angle D of the erecting prism 40 becomes −1.75°.

Although the proportionality coefficient k is set only in accordance with Equation (1) in the present embodiment, there is no limitation to this and, for example, a correction value due to frictional resistance or the like may be added in view of the frictional resistance or the like during the operation of the gimbal mechanism 50 in addition to Equation (1). In this case, the image blur correction of the housing 10 can be more accurately performed.

To correct the hand shake of the swing angle C, i.e. to cause a ray incident on the objective lens group 20 along the direction parallel to the reference plane 16 to be emitted along the longitudinal direction from the eyepiece group 30, the controller 90 may control the actuator 80 such that the second angular velocity B, which is an angular velocity of the erecting prism 40, is a product of the first angular velocity A, which is an angular velocity of the housing 10, and the proportionality coefficient k.

From the above, the controller 90 controls the actuator 80 such that the second angular velocity B is a product of the first angular velocity A and the proportionality coefficient k on the basis of the first angular velocity A output from the first angular velocity detection sensor 91, the second angular velocity B output from the second angular velocity detection sensor 92 and the proportionality coefficient k recorded in the memory 93 in advance, whereby the image blur correction of the housing 10 can be accurately performed by the image blur corrector 70 (specifically, the erecting prism 40 of the image blur corrector 70) even if the erecting prism 40 is provided other than at the middle position 11 between the objective lens group 20 and the eyepiece group 30. In other words, it is possible to improve a flexibility in the arrangement of the erecting prism 40 and accurately correct an image blur.

Finally, the image blur correction process is finished by an end operation on the operation unit 94 by the user.

Next, functions and effects by the present embodiment are described.

The anti-vibration optical device 1 according to the present embodiment includes the housing 10, the objective lens group 20 provided on the one side of the housing 10, the eyepiece group 30 provided on the other side of the housing 10, the image blur corrector 70 housed into the housing 10 to be located between the objective lens group 20 and the eyepiece group 30 and including the erecting prism 40, the gimbal mechanism 50 rotatably supporting the erecting prism 40 and the actuator 80 for rotating the erecting prism 40 via the gimbal mechanism 50, the first angular velocity detection sensor 91 for detecting the first angular velocity A, which is an angular velocity of the housing 10, the second angular velocity detection sensor 92 for detecting the second angular velocity B, which is an angular velocity of the erecting prism 40, and the controller 90 for controlling the actuator 80 on the basis of the first and second angular velocities A, B.

According to this configuration, it is possible to improve a flexibility in the arrangement of the erecting prism 40 and accurately correct an image blur by using the first angular velocity A, which is an angular velocity of the housing 10, in addition to the second angular velocity B, which is an angular velocity of the erecting prism 40.

Further, in the present embodiment, the controller 90 controls the actuator 80 such that the second angular velocity B is a product of the first angular velocity A and the proportionality coefficient k set in advance.

According to this configuration, even if the erecting prism 40 is provided other than at the middle position between the objective lens group 20 and the eyepiece group 30, the image blur correction of the housing 10 can be accurately performed by the image blur corrector 70 (specifically, the erecting prism 40 of the image blur corrector 70). As a result, it is possible to improve a flexibility in the arrangement of the erecting prism 40 and accurately correct an image blur.

In a telescope, an erecting prism needs to be used to convert an inverted image into an erect image. However, since an image blur can be corrected using the provided erecting prism 40 in the anti-vibration optical device 1 according to the present embodiment, optical elements such as a lens and a mirror need not be separately added. By forming the telescope into the configuration of the anti-vibration optical device 1, there is no longer any limitation in the arrangement position, the size and the like of the erecting prism 40, and application to optical devices of various types is possible. According to the anti-vibration optical device 1 relating to the present embodiment, effects such as a larger aperture of the objective lens group 20, a higher magnification, a wider field of view, miniaturization and weight reduction can be obtained.

Further, brightness, resolution and the like, which are important optical performances in the telescope, are characterized to be higher as the aperture of the objective lens group 20 becomes larger. In the anti-vibration optical device 1, higher optical performances than conventional art can be obtained.

Since the erecting prism 40 can be arranged at an optimal position in the anti-vibration optical device 1, the erecting prism 40 needs not be enlarged to take in rays on a peripheral edge part of the objective lens group 20. By miniaturizing the erecting prism 40, the entire shape of the anti-vibration optical device 1 can be reduced in size and the weight thereof can be reduced. The miniaturization of the erecting prism 40 is desirable also in efficient drive by the actuator 80.

Although the anti-vibration optical device 1 includes the housing 10, the objective lens group 20, the eyepiece group 30 and the image blur corrector 70 in the present embodiment, there is no limitation to this and, for example, the anti-vibration optical device 1 may be produced and distributed in the form of a unit including the housing 10 and the image blur corrector 70 without including the objective lens group 20 and the eyepiece group 30.

(Second Embodiment) Next, the configuration of an anti-vibration optical device 1 according to a second embodiment is described with reference to FIG. 7. It should be noted that points similar to those in the above first embodiment are not described and points of difference from the above first embodiment are mainly described.

Figure 7:
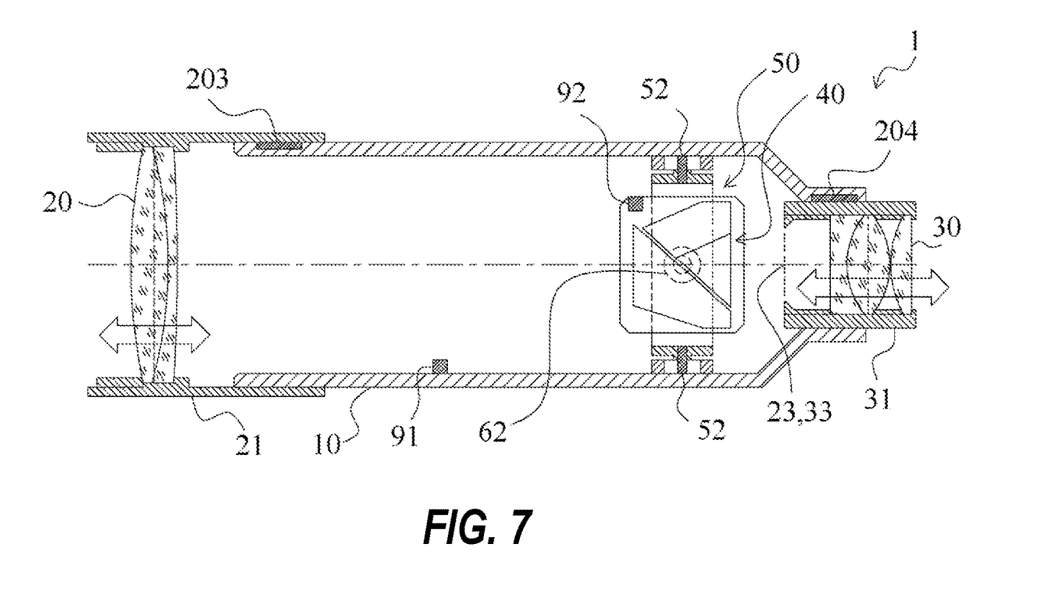
FIG. 7 is a sectional view showing an anti-vibration optical device according to a second embodiment of the present disclosure.

FIG. 7 is a sectional view showing the anti-vibration optical device 1 according to the second embodiment of the present disclosure.

Although the objective lens frame 21 holding the objective lens group 20 and the eyepiece frame 31 holding the eyepiece group 30 are respectively fixed on the front side of the housing 10 and the rear side of the housing 10 in the above first embodiment, there is no limitation to this and, for example, an objective lens frame 21 and an eyepiece frame 31 may be respectively provided on a front side of a housing 10 and a rear side of the housing 10 movably along a longitudinal direction as shown in FIG. 7. In such a case, the zooming or focusing of the anti-vibration optical device 1 can be performed by moving at least one of the objective lens group 20 and the eyepiece group 30 along the longitudinal direction. Of course, the zooming or focusing of the anti-vibration optical device 1 may be performed by moving at least some of a plurality of lenses constituting the objective lens group 20 or the eyepiece group 30 along the longitudinal direction.

In the present embodiment, a third position detection sensor 203 for detecting first position information of the objective lens frame 21 (i.e. the objective lens group 20) serving as a part of relative position-related information is mounted on the front side of the housing 10. A fourth position detection sensor 204 for detecting second position information of the eyepiece frame 31 (i.e. the eyepiece group 30) serving as another part of the relative position-related information is mounted on the rear side of the housing 10.

As the first position information of the objective lens group 20 detected by the third position detection sensor 203 changes according to a movement of the objective lens group 20, a first distance E (see FIG. 6) between the objective lens group 20 (specifically, a rear principal point 24 of the objective lens group 20) and an erecting prism 40 (specifically, first and second pivots 52, 62) changes. Specifically, the first distance E is based on the first position information. Similarly, as the second position information of the eyepiece group 30 detected by the fourth position detection sensor 204 changes according to a movement of the eyepiece group 30, a second distance F (see FIG. 6) between the eyepiece group 30 (specifically, a front principal point 34 of the eyepiece group 30) and the erecting prism 40 (specifically, the second and second pivots 52, 62) changes. Specifically, the second distance F is based on the second position information.

Accordingly, a controller 90 can calculate an optimal proportionality coefficient kv on the basis of the first position information of the objective lens group 20 detected by the third position detection sensor 203 and the second position information of the eyepiece group 30 detected by the fourth position detection sensor 204. Then, the controller 90 controls an actuator 80 such that a second angular velocity B detected by a second angular velocity detection sensor 92 is a product of a first angular velocity A detected by a first angular velocity detection sensor 91 and the calculated optimal proportionality coefficient kv, whereby an image blur can be accurately corrected even if the objective lens group 20 or the eyepiece group 30 is moved for the zooming or focusing of the anti-vibration optical device 1.

Specifically, the controller 90 obtains the first position information and the second position information serving as the relative position-related information and controls the actuator 80 on the basis of the first angular velocity A, the second angular velocity B, the first position information and the second position information, whereby an image blur can be accurately corrected by an image blur corrector 70 (specifically, the erecting prism 40 of the image blur corrector 70) even if the objective lens group 20 or the eyepiece group 30 is moved for the zooming or focusing of the anti-vibration optical device 1.

Next, an image blur correction process according to the second embodiment of the present disclosure is described with reference to FIGS. 8 to 9C.

Figure 8:
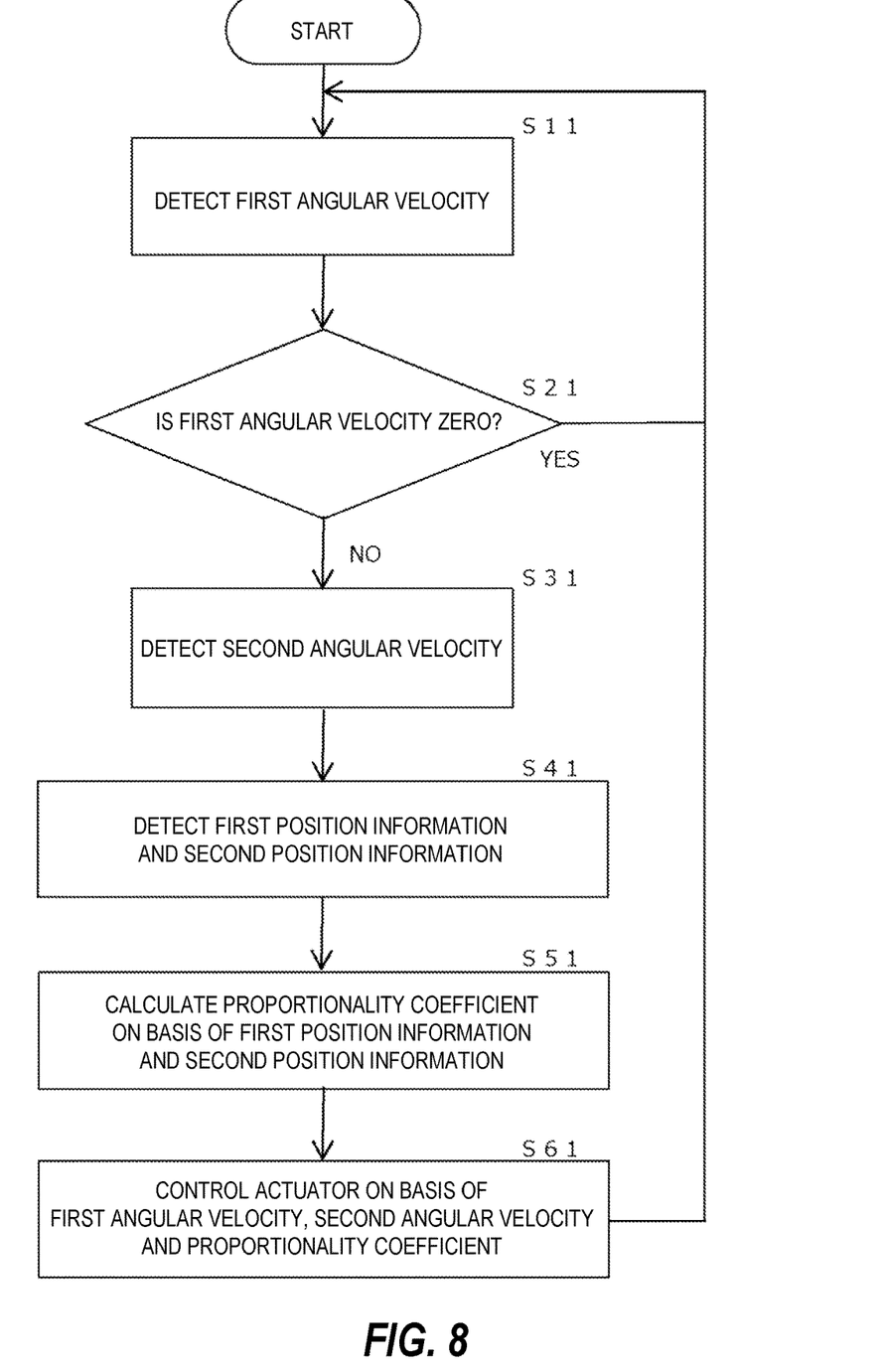
FIG. 8 is a flow chart showing an image blur correction process according to the second embodiment of the present disclosure.

FIG. 8 is a flow chart showing the image blur correction process according to the second embodiment of the present disclosure. FIG. 9A is a schematic state diagram showing a state where the erecting prism 40 is located closer to the eyepiece group 30 than the objective lens group 20 by movements of the objective lens group 20 and the eyepiece group 30. FIG. 9B is a schematic state diagram showing a state where the erecting prism 40 is located at the middle position 11 between the objective lens group 20 and the eyepiece group 30 by movements of the objective lens group 20 and the eyepiece group 30. FIG. 9C is a schematic state diagram showing a state where the erecting prism 40 is located closer to the objective lens group 20 than the eyepiece group 30 by movements of the objective lens group 20 and the eyepiece group 30.

First, if the image blur correction process is started by a start operation on an operation unit 94 by a user, advance is made to Step S11.

As shown in FIG. 8, in Step S11, the first angular velocity detection sensor 91 detects the first angular velocity A, which is an angular velocity of the housing 10 of the anti-vibration optical device 1. Then, the first angular velocity detection sensor 91 outputs the detected first angular velocity A to the controller 90, and advance is made to Step S21.

Subsequently, in Step S21, the controller 90 determines whether or not the first angular velocity A output from the first angular velocity detection sensor 91 is zero. Return is made to Step S11 if the first angular velocity A is zero (in the case of Yes), i.e. if the housing 10 of the anti-vibration optical device 1 is not inclined due to hand shake or the like, whereas advance is made to Step S31 if the first angular velocity A is not zero (in the case of No).

Subsequently, in the case of No in Step S21, the second angular velocity detection sensor 92 detects the second angular velocity B, which is an angular velocity of the erecting prism 40 rotatably supported by a gimbal mechanism 50, in Step S31. Then, the second angular velocity detection sensor 92 outputs the detected second angular velocity B to the controller 90, and advance is made to Step S41.

Subsequently, in Step S41, the third position detection sensor 203 detects the first position information of the objective lens group 20 and the fourth position detection sensor 204 detects the second position information of the eyepiece group 30. Then, the third and fourth position detection sensors 203, 204 output the detected first position information and second position information to the controller 90, and advance is made to Step S51.

Subsequently, in Step S51, the controller 90 calculates the optimal proportionality coefficient kv on the basis of the first position information output from the third position detection sensor 203 and the second position information output from the fourth position detection sensor 204, and advance is made to Step S61.

Figure 9A:
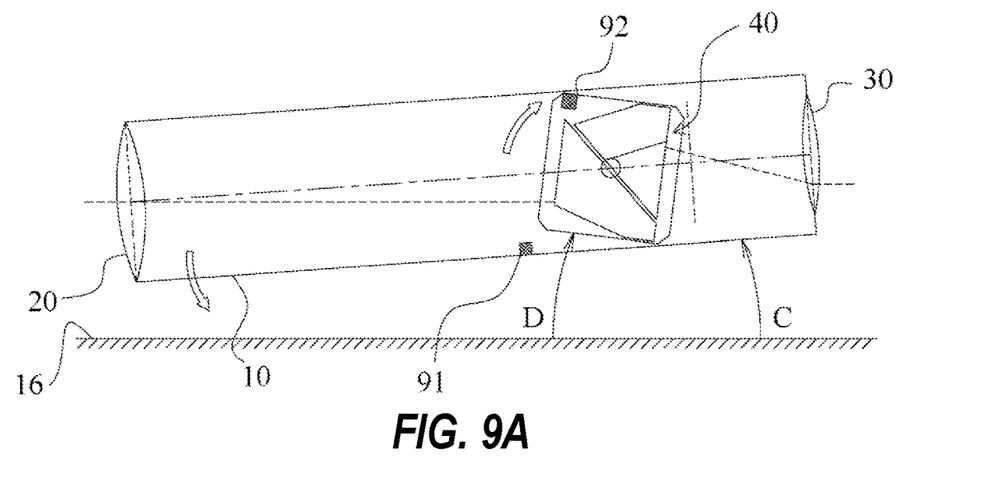
FIG. 9A is a schematic state diagram showing a state where an erecting prism is located closer to an eyepiece group than an objective lens group by movements of the objective lens group and the eyepiece group.

Specifically, in Step S51, the controller 90 calculates the optimal proportionality coefficient kv such that the optimal proportionality coefficient kv is negative when the erecting prism 40 is located closer to the eyepiece group 30 than the objective lens group 20 (see FIG. 9A). In this case, the controller 90 controls the actuator 80 such that the erecting prism 40 is rotated in a direction opposite to a swing direction of the housing 10 with respect to a reference plane 16. Specifically, the controller 90 controls the actuator 80 such that an absolute value of a relative angle of the erecting prism 40 with respect to the housing 10 is larger than an absolute value of a swing angle C of the housing 10.

By doing so, an image blur correction in the housing 10 can be accurately performed even if the erecting prism 40 is located closer to the eyepiece group 30 than the objective lens group 20. Thus, an aperture of the objective lens group 20 can be increased without enlarging the erecting prism 40 as compared to a configuration in which the erecting prism 40 is provided at the middle position 11 between the objective lens group 20 and the eyepiece group 30. Further, the weight reduction and miniaturization of the anti-vibration optical device 1 can be realized by the miniaturization of the erecting prism 40.

Figure 9B:
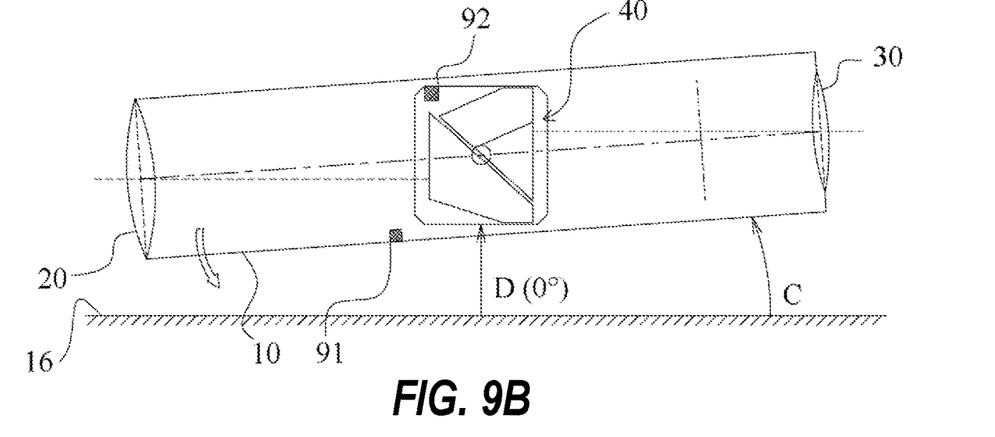
FIG. 9B is a schematic state diagram showing a state where the erecting prism is located at a middle position between the objective lens group and the eyepiece group by movements of the objective lens group and the eyepiece group.

Further, in Step S51, the controller 90 calculates the optimal proportionality coefficient kv such that the optimal proportionality coefficient kv is zero when the erecting prism 40 is located at the middle position 11 between the objective lens group 20 and the eyepiece group 30 (see FIG. 9B). In this case, the controller 90 controls the actuator 80 such that the erecting prism 40 is not rotated with respect to the reference plane 16. Specifically, the controller 90 controls the actuator 80 such that the absolute value of the relative angle of the erecting prism 40 with respect to the housing 10 is equal to the absolute value of the swing angle C of the housing 10.

Figure 9C:
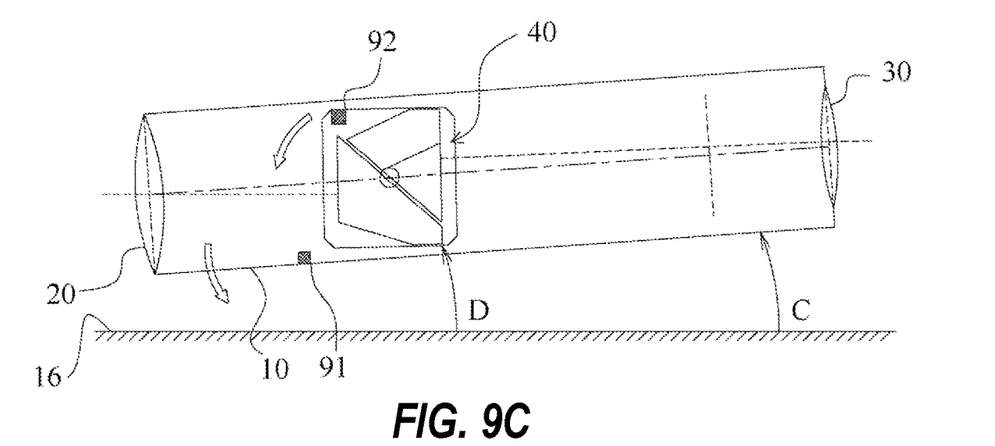
FIG. 9C is a schematic state diagram showing a state where the erecting prism is located closer to the objective lens group than the eyepiece group by movements of the objective lens group and the eyepiece group.

Furthermore, in Step S51, the controller 90 calculates the optimal proportionality coefficient kv such that the optimal proportionality coefficient kv is positive when the erecting prism 40 is located closer to the objective lens group 20 than the eyepiece group 30 (see FIG. 9C). In this case, the controller 90 controls the actuator 80 such that the erecting prism 40 is rotated in the same direction as the swing direction of the housing 10 with respect to the reference plane 16. Specifically, the controller 90 controls the actuator 80 such that the absolute value of the relative angle of the erecting prism 40 with respect to the housing 10 is smaller than the absolute value of the swing angle C of the housing 10.

By doing so, an image blur correction in the housing 10 can be accurately performed even if the erecting prism 40 is located closer to the objective lens group 20 than the eyepiece group 30. Thus, the relative angle of the erecting prism 40 with respect to the housing 10 can be made smaller as compared to the configuration in which the erecting prism 40 is provided at the middle position 11 between the objective lens group 20 and the eyepiece group 30 or a configuration in which the erecting prism 40 is provided closer to the eyepiece group 30 than the objective lens group 20. As a result, the power saving of the actuator 80 can be realized.

From the above, in Step S51, the controller 90 calculates such an optimal proportionality coefficient kv that becomes smaller as the position of the erecting prism 40 becomes closer to the eyepiece group 30 with respect to the objective lens group 20. For example, the optimal proportionality coefficient kv calculated by the controller 90 changes in an order of +0.5, 0, −0.5, −1.0, −2.0 and −4.0. In other words, in Step S51, the controller 90 calculates such an optimal proportionality coefficient kv that becomes larger as the position of the erecting prism 40 becomes closer to the objective lens group 20 with respect to the eyepiece group 30.

Although a calculation method (i.e. a setting method) of the optimal proportionality coefficient kv has been described above, such a setting method may be directly applied to the setting of the proportionality coefficient k of the first embodiment.

Subsequently, in Step S61, the controller 90 controls the actuator 80 on the basis of the first angular velocity A output from the first angular velocity detection sensor 91, the second angular velocity B output from the second angular velocity detection sensor 92 and the calculated optimal proportionality coefficient kv, and return is made to Step S11.

Specifically, in Step S61, the controller 90 controls the actuator 80 such that the second angular velocity B output from the second angular velocity detection sensor 92 is a product of the first angular velocity A output from the first angular velocity detection sensor 91 and the optimal proportionality coefficient kv, and return is made to Step S11. Accordingly, an image blur can be accurately corrected by the image blur corrector 70 (specifically, the erecting prism 40 of the image blur corrector 70) even if the objective lens group 20 or the eyepiece group 30 is moved for the zooming or focusing of the anti-vibration optical device 1.

Finally, the image blur correction process is finished by an end operation on the operation unit 94 by the user.

(Modification) Although Steps S31, S41 and S51 are sequentially performed in the present embodiment, there is no limitation to this and, for example, a sequence of Steps S31 and S41 may be exchanged or Steps S31 and S41 may be simultaneously performed. In these cases, Step S51 may be performed after Step S41.

Further, although the objective lens frame 21 and the eyepiece frame 31 are respectively provided on the front side of the housing 10 and on the rear side of the housing 10 movably along the longitudinal direction in the present embodiment, there is no limitation to this and, for example, either one of the objective lens frame 21 and the eyepiece frame 31 may be provided movably along the longitudinal direction in the housing 10. In this case, only the third or fourth position detection sensor 203, 204 corresponding to the objective lens frame 21 or the eyepiece frame 31 movably provided in the housing 10 may be mounted on the front or rear side of the housing 10.

(Third Embodiment) Next, the configuration of an anti-vibration optical device 1 according to a third embodiment is described with reference to FIG. 10. It should be noted that points similar to those in the above second embodiment are not described and points of difference from the above second embodiment are mainly described.

Figure 10:
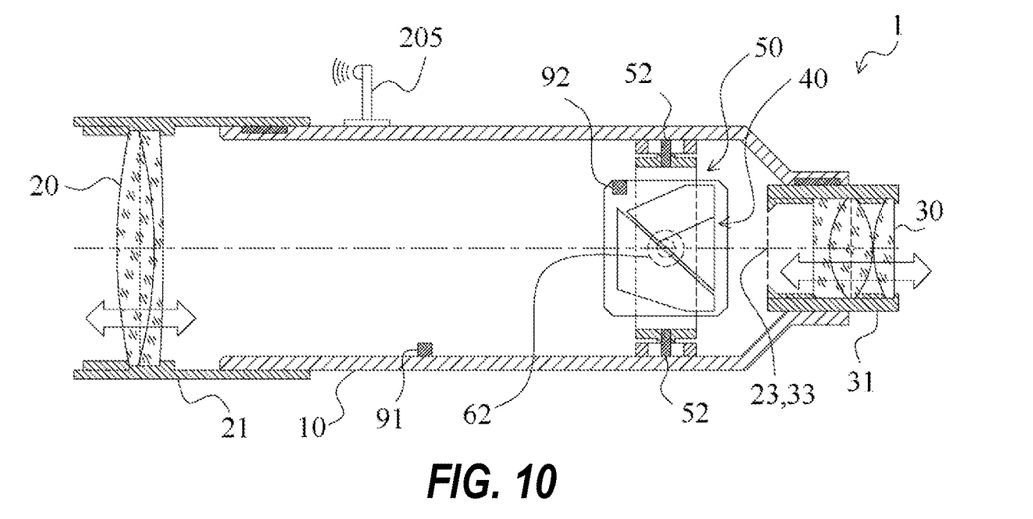
FIG. 10 is a sectional view showing an anti-vibration optical device according to a third embodiment of the present disclosure.

FIG. 10 is a sectional view showing the anti-vibration optical device 1 according to the third embodiment of the present disclosure.

Although the third and fourth position detection sensors 203, 204 are mounted in the housing 10 in the above second embodiment, there is no limitation to this and, for example, a distance detection sensor (e.g. a laser distance detection sensor) 205 as shown in FIG. 10 may be mounted instead of the third and fourth position detection sensors 203, 204.

The distance detection sensor 205 is a sensor for detecting distance information between a target and the anti-vibration optical device 1. As the distance information detected by the distance detection sensor 205 changes, a first distance E or/and a second distance F change(s). Specifically, the first distance E or/and the second distance F is/are based on the distance information.

Accordingly, a controller 90 can calculate an optimal proportionality coefficient kv on the basis of the distance information detected by the distance detection sensor 205. Then, the controller 90 controls an actuator 80 such that a second angular velocity B detected by a second angular velocity detection sensor 92 is a product of a first angular velocity A detected by a first angular velocity detection sensor 91 and the calculated optimal proportionality coefficient kv, whereby an image blur can be accurately corrected even if an objective lens group 20 or an eyepiece group 30 is moved for the zooming or focusing of the anti-vibration optical device 1.

Specifically, the controller 90 obtains the distance information serving as relative position-related information and controls the actuator 80 on the basis of the first angular velocity A, the second angular velocity B and the distance information, whereby an image blur can be accurately corrected by an image blur corrector 70 (specifically, an erecting prism 40 of the image blur corrector 70) even if the objective lens group 20 or the eyepiece group 30 is moved for the zooming or focusing of the anti-vibration optical device 1.

(Fourth Embodiment) Next, the configuration of an anti-vibration optical device 1 according to a fourth embodiment is described. It should be noted that points similar to those in the above second embodiment are not described and points of difference from the above second embodiment are mainly described.

Although the third and fourth position detection sensors 203, 204 are mounted in the housing 10 in the above second embodiment, there is no limitation to this and, for example, a changeover switch (not shown) may be mounted instead of the third and fourth position detection sensors 203, 204.

A user can switch the changeover switch according to a distance between a target and the anti-vibration optical device 1. If an objective lens group 20 or/and an eyepiece group 30 is/are moved in a front-rear direction to change the distance between the target and the anti-vibration optical device 1, a first distance E or/and a second distance F change(s).

Accordingly, the controller 90 can calculate an optimal proportionality coefficient kv on the basis of distance information by the changeover switch. Then, the controller 90 controls an actuator 80 such that a second angular velocity B detected by a second angular velocity detection sensor 92 is a product of a first angular velocity A detected by a first angular velocity detection sensor 91 and the calculated optimal proportionality coefficient kv, whereby an image blur can be accurately corrected even if the objective lens group 20 or the eyepiece group 30 is moved for the zooming or focusing of the anti-vibration optical device 1.

Specifically, the controller 90 obtains the distance information serving as relative position-related information and controls the actuator 80 on the basis of the first angular velocity A, the second angular velocity B and the distance information, whereby an image blur can be accurately corrected by an image blur corrector 70 (specifically, an erecting prism 40 of the image blur corrector 70) even if the objective lens group 20 or the eyepiece group 30 is moved for the zooming or focusing of the anti-vibration optical device 1.

(Fifth Embodiment) Next, the configuration of an anti-vibration optical device 1 according to a fifth embodiment is described with reference to FIGS. 11 and 12. It should be noted that points similar to those in the above first embodiment are not described and points of difference from the above first embodiment are mainly described.

Figure 11:
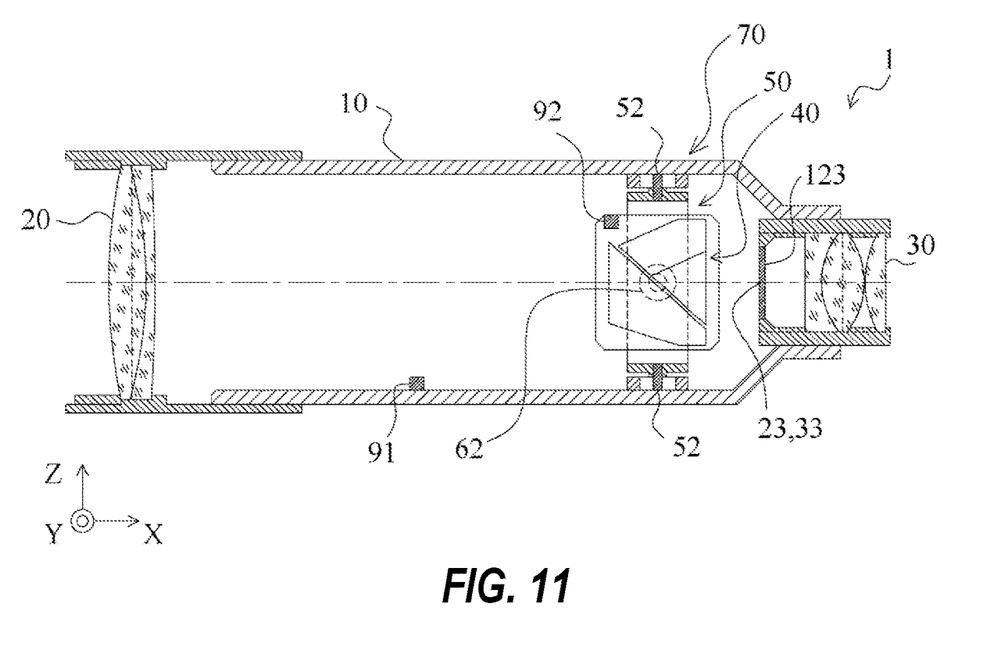
FIG. 11 is a sectional view showing an anti-vibration optical device according to a fifth embodiment of the present disclosure.

FIG. 11 is a sectional view showing the anti-vibration optical device 1 according to the fifth embodiment of the present disclosure. FIG. 12 is a schematic diagram showing the anti-vibration optical device 1 according to the fifth embodiment of the present disclosure. It should be noted that a single objective lens and a single eyepiece are respectively shown as an objective lens group 20 and an eyepiece group 30 in FIG. 12.

Figure 12:
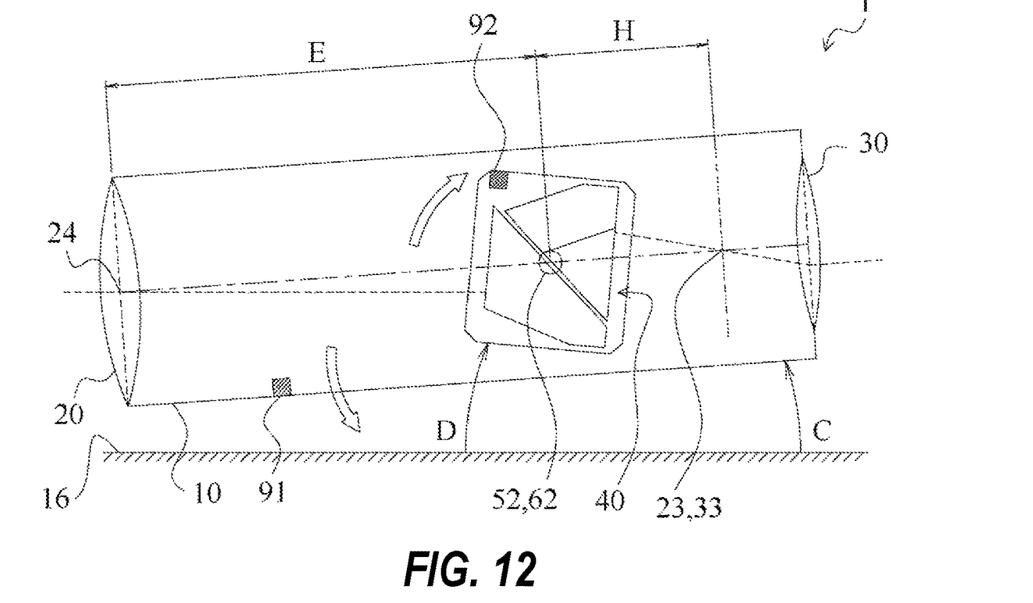
FIG. 12 is a schematic diagram showing the anti-vibration optical device according to the fifth embodiment of the present disclosure.

As shown in FIGS. 11 and 12, a reticle 123 is installed at the position of a rear focus 23 of the objective lens group 20 in the anti-vibration optical device 1. The reticle 123 is such that crosshairs, scales and the like engraved in a transparent plate material. In this way, the anti-vibration optical device 1 can be used as a sight and can measure a distance between a target and the anti-vibration optical device 1, a viewing angle and the like.

If a user uses the anti-vibration optical device 1 while holding the anti-vibration optical device 1 by hand, a housing 10 may be inclined upward, downward, leftward or rightward by the user's hand shake. If the housing 10 is so inclined that the objective lens group 20 faces downward, a controller 90 controls an actuator 80 such that a rotation angle D (second angular velocity B) of an erecting prism 40 is a product of a swing angle C (first angular velocity A) of the housing 10 and a proportionality coefficient k. In this way, a ray incident on the objective lens group 20 in an X-axis direction of FIG. 11 from a target passes through the rear focus 23 (center position of the reticle 123) of the objective lens group 20 after passing through the erecting prism 40. Although inclination in a vertical direction (rotating direction about a Y-axis in FIG. 11) is described here, the same applies also to inclination in a lateral direction (rotating direction about a Z-axis in FIG. 11).

The controller 90 controls the actuator 80 such that the rotation angle D (second angular velocity B) of the erecting prism 40 is a product of the swing angle C (first angular velocity A) of the housing 10 and the proportionality coefficient k, whereby the ray incident on the objective lens group 20 passes through the rear focus 23 (center position of the reticle 123) of the objective lens group 20 without being shifted. As a result, the user observing the target can observe a corrected image without a target image being shifted on the reticle 123 even if the housing 10 vibrates due to hand shake.

In the present embodiment, the proportionality coefficient k is known to satisfy the following Equation (2) from a result of ray tracking. It is assumed that a first distance E is a distance between the objective lens group 20 (specifically, a rear principal point 24 of the objective lens group 20) and the erecting prism 40 (specifically, first and second pivots 52, 62) and a fourth distance H is a distance between the erecting prism 40 (specifically, the first and second pivots 52, 62) and the rear focus 23 of the objective lens group 20 (see FIG. 12).

$$k=0.5(H-E)/H \qquad \text{(Equation 2)}$$

If the first and fourth distances E, H are respectively 60 mm and 15 mm as an example of the present embodiment, the proportionality coefficient k is −1.5. Thus, if the swing angle C of the housing 10 is +1°, the controller 90 controls the actuator 80 such that the rotation angle D of the erecting prism 40 becomes −1.5°.

In the anti-vibration optical device 1, a light emitting element may be installed at the position of the rear focus 23 of the objective lens group 20. For example, by installing a light emitting device at the position of the rear focus 23 of the objective lens group, light can be irradiated to a target without being shifted even if the housing 10 vibrates due to hand shake. In the anti-vibration optical device 1, a light receiving element may be installed at the position of the rear focus 23 of the objective lens group 20. For example, by installing a light receiving device at the position of the rear focus 23 of the objective lens group, light emitted from the target can be received without being shifted even if the housing 10 vibrates due to hand shake.

In the anti-vibration optical device 1, the reticle 123 installed at the position of the rear focus 23 of the objective lens group 20 may be constituted by a transmission-type liquid crystal display. In this case, the user can observe necessary information and the like simultaneously with an image of a target.

In the anti-vibration optical device 1, the reticle 123 installed at the position of the rear focus 23 of the objective lens group 20 may be installed at a position away from the rear focus 23 of the objective lens group 20 and optically projected to the position of the rear focus 23 of the objective lens group 20 by a lens or the like.

(Sixth Embodiment) Next, the configuration of an anti-vibration optical device 1 according to a sixth embodiment is described with reference to FIG. 13. It should be noted that points similar to those in the above first embodiment are not described and points of difference from the above first embodiment are mainly described.

Figure 13:
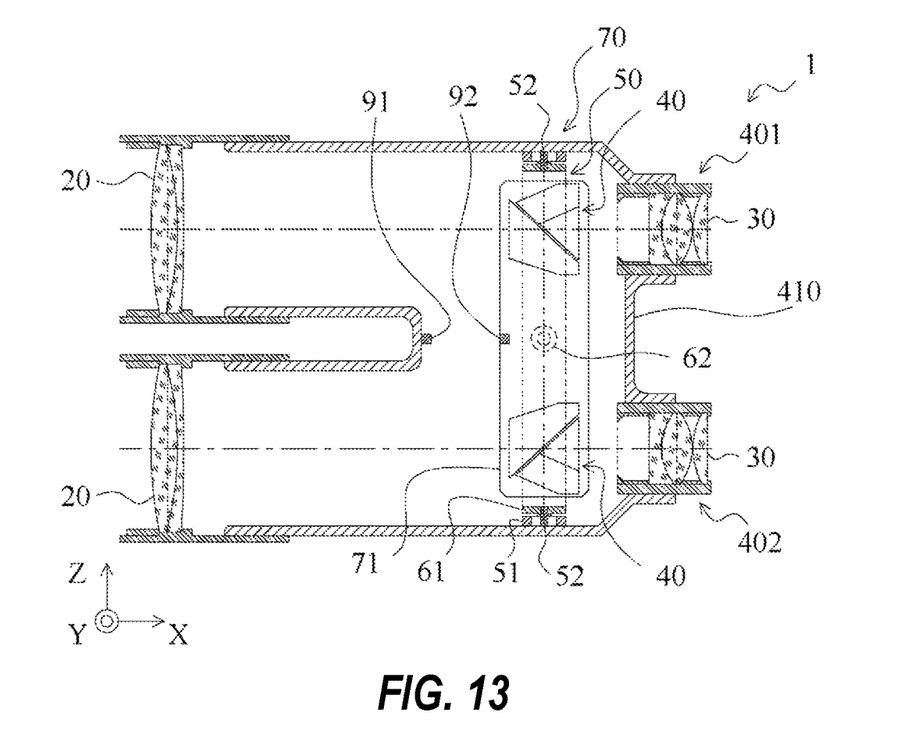
FIG. 13 is a sectional view showing an anti-vibration optical device according to a sixth embodiment of the present disclosure.

FIG. 13 is a sectional view showing the anti-vibration optical device 1 according to the sixth embodiment of the present disclosure.

Although the anti-vibration optical device 1 is constituted by a monocular in the above first embodiment, there is no limitation to this and, for example, the anti-vibration optical device 1 may be constituted by a binoculars (specifically, binocular telescope) as shown in FIG. 13. In this case, the binoculars 1 includes a pair of monoculars (specifically, monocular telescopes) 401, 402 provided in parallel and a housing 410 in which the pair of monoculars 401, 402 are provided.

The pair of monoculars 401, 402 include a pair of objective lens groups 20, 20, a pair of eyepiece groups 30, 30 and a common single image blur corrector 70. The image blur corrector 70 includes a pair of erecting prisms 40, 40 and a single gimbal mechanism 50. The gimbal mechanism 50 includes an outer frame 51 fixed inside a housing 10, an inner frame 61 rotatably supported inside the outer frame 51 via a first pivot 52 extending along a Z-axis direction and a prism frame 71 rotatably supported inside the inner frame 61 via a second pivot 62 extending along a Y-axis direction.

Further, although the prism frame 71 is configured such the single erecting prism 40 is fixed thereto in the above first embodiment, there is no limitation to this and, for example, the prism frame 71 may be configured such that the pair of erecting prisms 40, 40 as shown in FIG. 13 are fixed thereto. It should be noted that the pair of erecting prisms 40, 40 respectively constitute the pair of monoculars 401, 402.

Although the embodiments of the present disclosure have been described above, the above embodiments are merely some application examples of the present disclosure and not intended to limit the technical scope of the present disclosure to specific configurations of the above embodiments.

The present application claims a priority of Japanese Patent Application No. 2020-25750 filed with the Japan Patent Office on Feb. 19, 2020, all the contents of which are hereby incorporated by reference.

What is claimed is:

1. An anti-vibration telescope, comprising:
   a housing;
   a first optical element provided on one side of the housing;
   a second optical element provided on another side of the housing;
   an image blur corrector housed into the housing to be located between the first optical element and the second optical element, the image blur corrector including an erecting prism, a supporting mechanism rotatably supporting the erecting prism and an actuator for rotating the erecting prism via the supporting mechanism;
   a first detector configured to detect a first angular velocity, the first angular velocity being an angular velocity of the housing;
   a second detector configured to detect a second angular velocity, the second angular velocity being an angular velocity of the erecting prism; and
   a controller configured to control the actuator based on the first angular velocity detected by the first detector and the second angular velocity detected by the second detector and configured to control the actuator such that the second angular velocity is a product of the first angular velocity and a proportionality coefficient set in advance.

2. The anti-vibration telescope according to claim 1, wherein:
   the proportionality coefficient is set to be negative when the erecting prism is located closer to the second optical element than the first optical element.

3. The anti-vibration telescope according to claim 1, wherein:
   the proportionality coefficient is set to be positive when the erecting prism is located closer to the first optical element than the second optical element.

4. The anti-vibration telescope according to claim 1, wherein:
   the proportionality coefficient is set to become smaller as the erecting prism is located closer to the second optical element with respect to the first optical element.

5. The anti-vibration telescope according to claim 1, wherein:
   the controller is further configured to obtain relative position-related information of the erecting prism with respect to the first optical element and the second optical element and control the actuator based on the first angular velocity, the second angular velocity and the relative position-related information of the erecting prism with respect to the first optical element and the second optical element.

6. The anti-vibration telescope according to claim 5, wherein:
   the controller is further configured to calculate a proportionality coefficient based on the relative position-related information and control the actuator such that the second angular velocity is a product of the first angular velocity and the proportionality coefficient.

* * * * *